United States Patent
Yamagata

[19]

[11] Patent Number: 5,950,031
[45] Date of Patent: *Sep. 7, 1999

[54] COMBINED FILM AND DIGITAL CAMERA HAVING DISPLAY

[75] Inventor: Naoki Yamagata, Tokyo, Japan

[73] Assignee: Asah Kogaku Kogto Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/896,852

[22] Filed: Jul. 18, 1997

[30] Foreign Application Priority Data

Jul. 26, 1996 [JP] Japan .................................. 8-215004

[51] Int. Cl.⁶ ........................ G03B 17/48; G03B 19/00; G03B 29/00

[52] U.S. Cl. ........................ 396/429; 396/287; 348/64; 358/909.1

[58] Field of Search .................................. 396/281, 287, 396/291, 297, 299, 300, 310, 429, 432; 348/64; 358/909.1

[56] References Cited

U.S. PATENT DOCUMENTS

| | | |
|---|---|---|
| 4,714,962 | 12/1987 | Levine ....................................... 348/64 |
| 5,179,478 | 1/1993 | Aoki . |
| 5,619,257 | 4/1997 | Reele et al. .......................... 396/429 X |

*Primary Examiner*—Howard B. Blankenship
*Attorney, Agent, or Firm*—Greenblum & Bernstein, P.L.C.

[57] ABSTRACT

A camera is presented which includes a first image taking portion for taking a picture of a subject as a digital image to be stored in a first memory and a second image taking portion for taking a picture of a subject as an image on a film. The camera further includes a controller for selectively performing one of first, second and third operations, in the first operation the first image taking portion is actuated independently of the second image taking portion to take a picture, in the second operation the second image taking portion is actuated independently of the first image taking portion to take a picture, and in the third operation both the first and second image taking portions are simultaneously actuated to take a picture of a common subject. The camera further includes a second memory for storing information about which of the first, second and third operations has been performed for which picture taken, and an indicating device for visually indicating the information.

17 Claims, 14 Drawing Sheets

1

COMBINED FILM AND DIGITAL CAMERA HAVING DISPLAY

BACKGROUND OF THE INVENTION

1. Field of the Invention

The present invention relates to a camera capable of photographing subjects on a photosensitive film while photographing the same subjects as digital images through an image pick-up device.

2. Description of Related Art

A camera for photographing subjects with the use of a photosensitive film (e.g., 35 mm film) while photographing the same subjects as digital images to be electrically stored in a memory, is known. With such a camera, photographed subject images can be seen on an LCD monitor, a TV monitor, or the like immediately after the subjects are photographed, without waiting for the film to be developed and printed.

Such a camera is generally provided with a digital camera portion having an image pick-up element (such as a CCD) for photographing subjects in the form of digital images to be stored in a memory, and an ordinary camera portion (i.e., analog camera portion) for photographing subjects with the use of a film.

In such a camera, either one of the digital camera portion or the analog camera portion can be selectively actuated independent of the other to obtain either a digital subject image or an analog subject image (i.e., subject image on a film). Namely, a user can freely select one of the following three photographic modes: an analog photographic mode in which only the analog camera portion is actuated to obtain a subject image on a film; a digital photographic mode in which only the digital camera portion is actuated to obtain a digital subject image; and an analog/digital photographic mode in which both the analog and digital camera portions are simultaneously actuated to obtain analog and digital subject images at a common shot. Accordingly, a manner of photographing is available such that, e.g., both a digital and an analog images are obtained for the first shot, only the analog image is obtained for the second shot, only a digital image is obtained for the third shot, etc.

In such type of conventional camera, however, a user needs to record (e.g., jot down on a piece of paper) information about which photographic mode has been performed for which shot, otherwise the user may not be able to recall, e.g., whether or not the same subject image has been exposed on a film when a photographed digital image is displayed on an LCD or TV monitor.

SUMMARY OF THE INVENTION

An object of the present invention is to provide a camera having the aforementioned three photographic modes, but which does not require the user to keep track of data about which photographic mode has been performed for which shot.

To achieve the object mentioned above, according to an aspect of the present invention, there is provided a camera which includes: a first image taking portion for taking a picture of a subject as a digital image to be stored in a first memory; a second image taking portion for taking a picture of a subject as an image on a film; a controller for selectively performing one of first, second and third operations, in the first operation the first image taking portion is actuated independently of the second image taking portion to take a picture, in the second operation the second image taking portion is actuated independently of the first image taking portion to take a picture, and in the third operation both the first and second image taking portions are simultaneously actuated to take a picture of a common subject; a second memory for storing information about which of the first, second and third operations has been performed for which picture taken; and an indicating device for visually indicating the information.

Preferably, the first image taking portion includes: an image pick-up element; a first optical system for forming a subject image on the image pick-up element; and an image processor for processing image data of the subject image which is obtained through the image pick-up element to obtain the digital image. Preferably, the image pick-up element is a CCD.

Preferably, the second image taking portion includes a second optical system for forming the subject image on the film.

Preferably, the camera further includes a recording means for recording the obtained digital image in the first memory.

Preferably, the camera further includes a recording means for recording the information in the second memory.

Preferably, the first memory and the second memory are provided as a common memory. Preferably, the common memory is a flash memory.

Preferably, the camera further includes means for manually setting one of first, second and third modes, in the first mode the controller performs the first operation, in the second mode the controller performs the second operation, and in the third mode the controller performs the third operation.

Preferably, the camera further includes means for outputting set mode information about which of the first, second and third modes has been set by the setting means, wherein the information is automatically stored in the second memory in accordance with the set mode information output from the outputting means.

Preferably, the camera further includes a reproducing device for reproducing the obtained digital image, wherein the indicating means visually indicates the obtained digital image reproduced by the reproducing device together with the information.

Preferably, the indicating means includes an LCD panel.

Preferably, the camera further includes means for erasing the digital image stored in the first memory, wherein that piece of the information solely for the erased digital image which is stored in the second memory is replaced by a new one when the erasing means erases the digital image.

Preferably, the camera further includes means for judging whether there is an exposed frame of the film which bears an image identical to the erased digital image.

Preferably, the camera further includes means for arranging digital images stored in the first memory such that after the erasing means erases the digital image other digital images stored in the memory are consecutively stored therein without making a blanked storing space between two adjacent stored digital images in the first memory in the case where the judging means judges that there is no exposed frame of the film which bears the image identical to the erased digital image.

According to another aspect of the present invention, there is provided a camera which includes: a first image taking portion for taking a picture of a subject as a digital image to be stored in a first memory; a second image taking portion for taking a picture of a subject as an image on a film; a selector for manually selecting one of first second and third picture taking modes, in the first picture taking mode only the first image taking portion is actuated, in the second picture taking mode only the second image taking portion is actuated, and in the third picture taking mode both the first and second image taking portions are simultaneously actuated; a second memory for storing information about which of the first, second and third picture taking modes has been performed for which picture taken; and a display for visually indicating the information.

The present disclosure relates to subject matter contained in Japanese Patent Application No. 8-215004 (filed on Jul. 26, 1996) which is expressly incorporated herein by reference in its entirety.

BRIEF DESCRIPTION OF THE DRAWINGS

The invention is described below in detail with reference to the accompanying drawings in which.

DESCRIPTION OF THE PREFERRED EMBODIMENT

Figure 1:
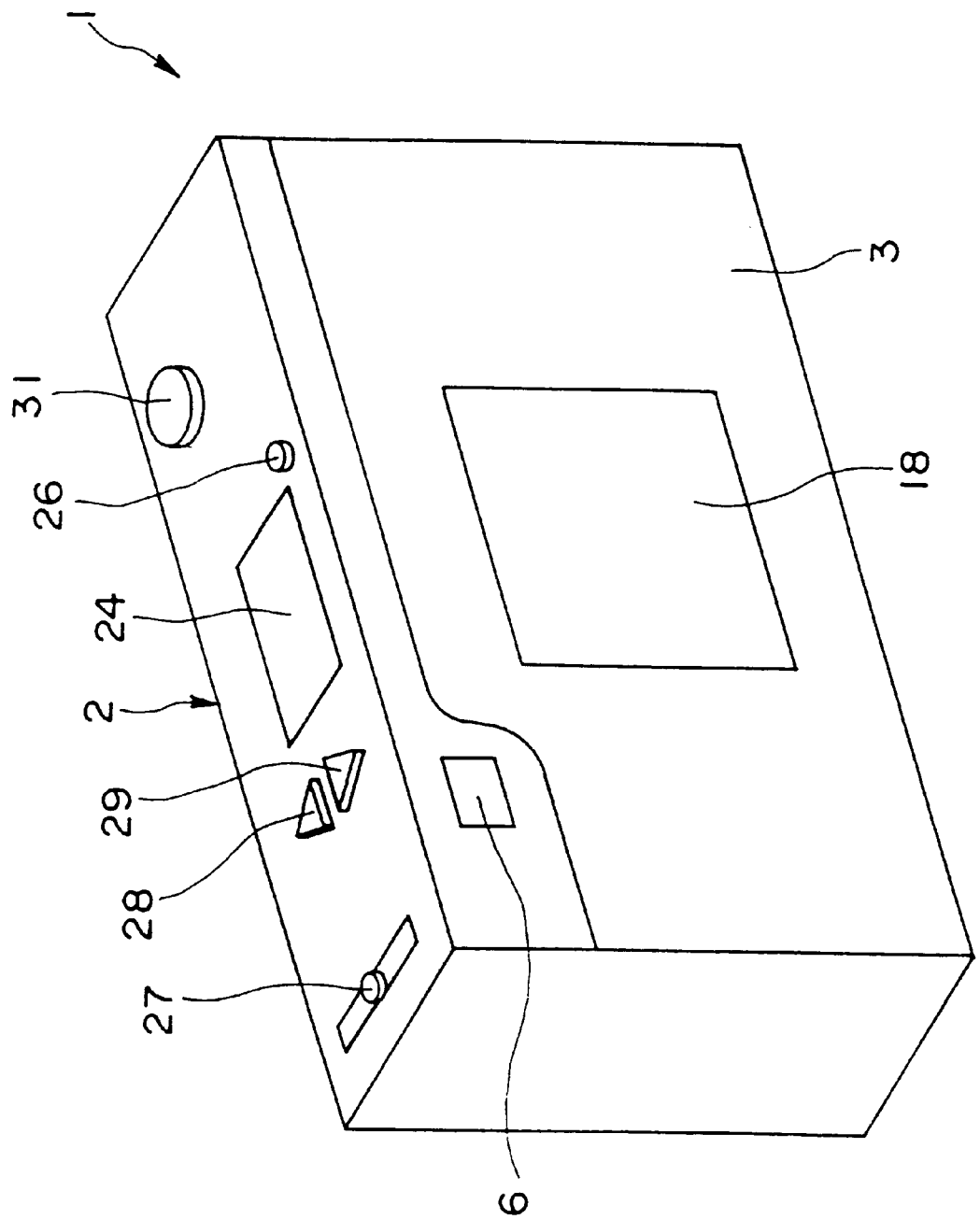
FIG. 1 is a perspective view of an embodiment of camera to which the present invention is applied, as viewed from the rear of the camera.
Figure 2:
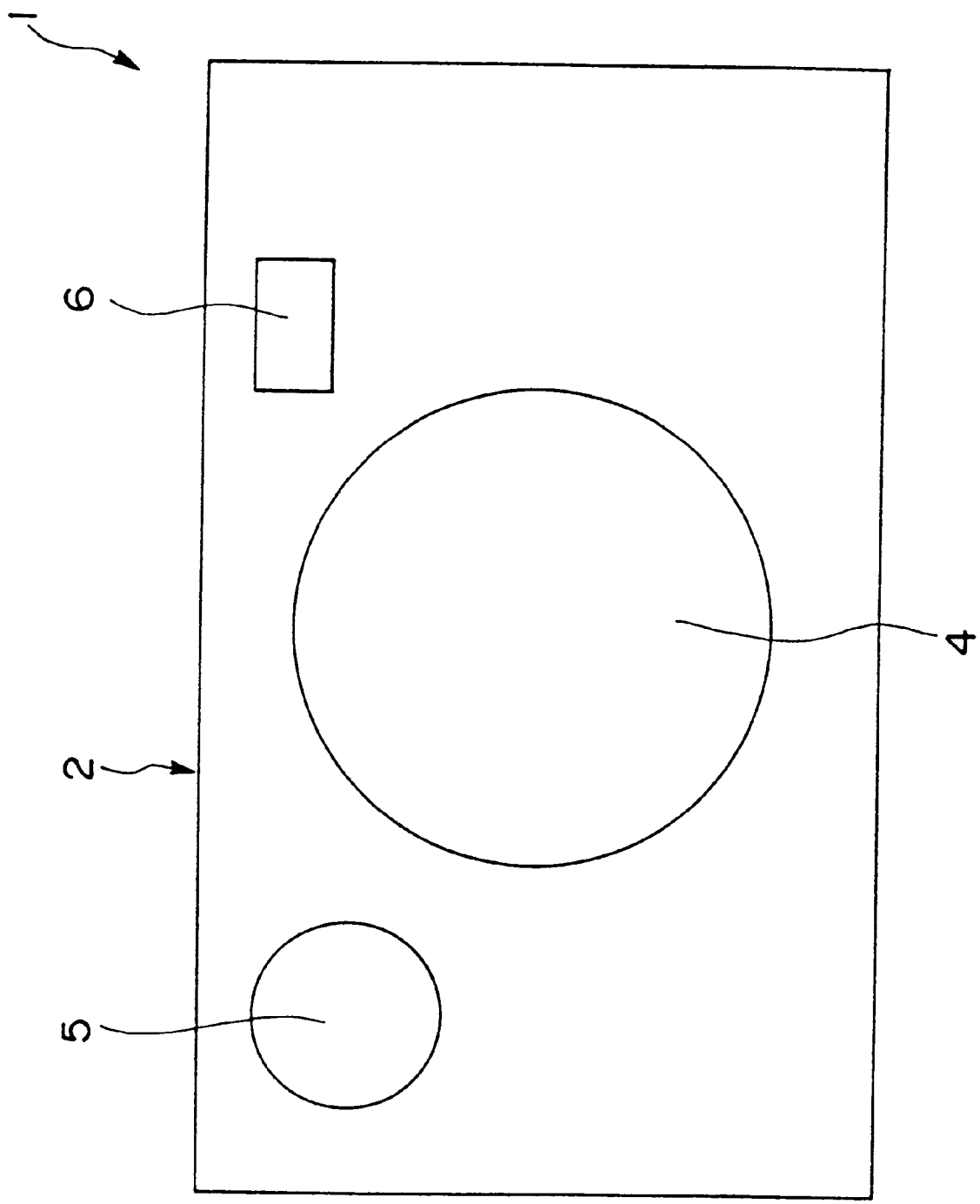
FIG. 2 is a front elevational view of the camera shown in FIG. 1.

FIGS. 1 and 2 show an embodiment of a camera to which the present invention is applied. The camera 1 is a type of camera provided with a digital camera portion for photographing subjects as digital images and an ordinary camera portion (i.e., analog camera portion) for photographing subjects with a photosensitive film (e.g., 35 mm film).

The camera 1 has a substantially rectangular (box-shaped) camera body 2 which is provided (at the front thereof) with a first photographic optical system 4 and a second photographic optical system 5. Subject images are focused on the film through the first photographic optical system 4, while the same subject images are focused on an image-receiving surface of a CCD 8 (see FIG. 3) through the second photographic optical system 5.

The camera 1 is further provided (at the top of the camera body 2) with a photographic information indicating portion 24, a mode selecting button 26, a recording mode selecting switch 27, a pair of up/down buttons 28 and 29, and a shutter release button 31. The shutter release button 31 is of a type that triggers and locks lens autofocusing when halfway depressed and takes a picture when fully depressed. The camera 1 is further provided (at the back of the camera body 2) with a back lid 3, which is opened when the film is loaded or discharged from the camera 1. At the back of the back lid 3, an LCD monitor 18 is positioned, which indicates photographed digital images thereon. The camera 1 is provided with a finder optical system 6 having front and rear ends respectively directed to the front and rear of the camera 1.

Figure 3:
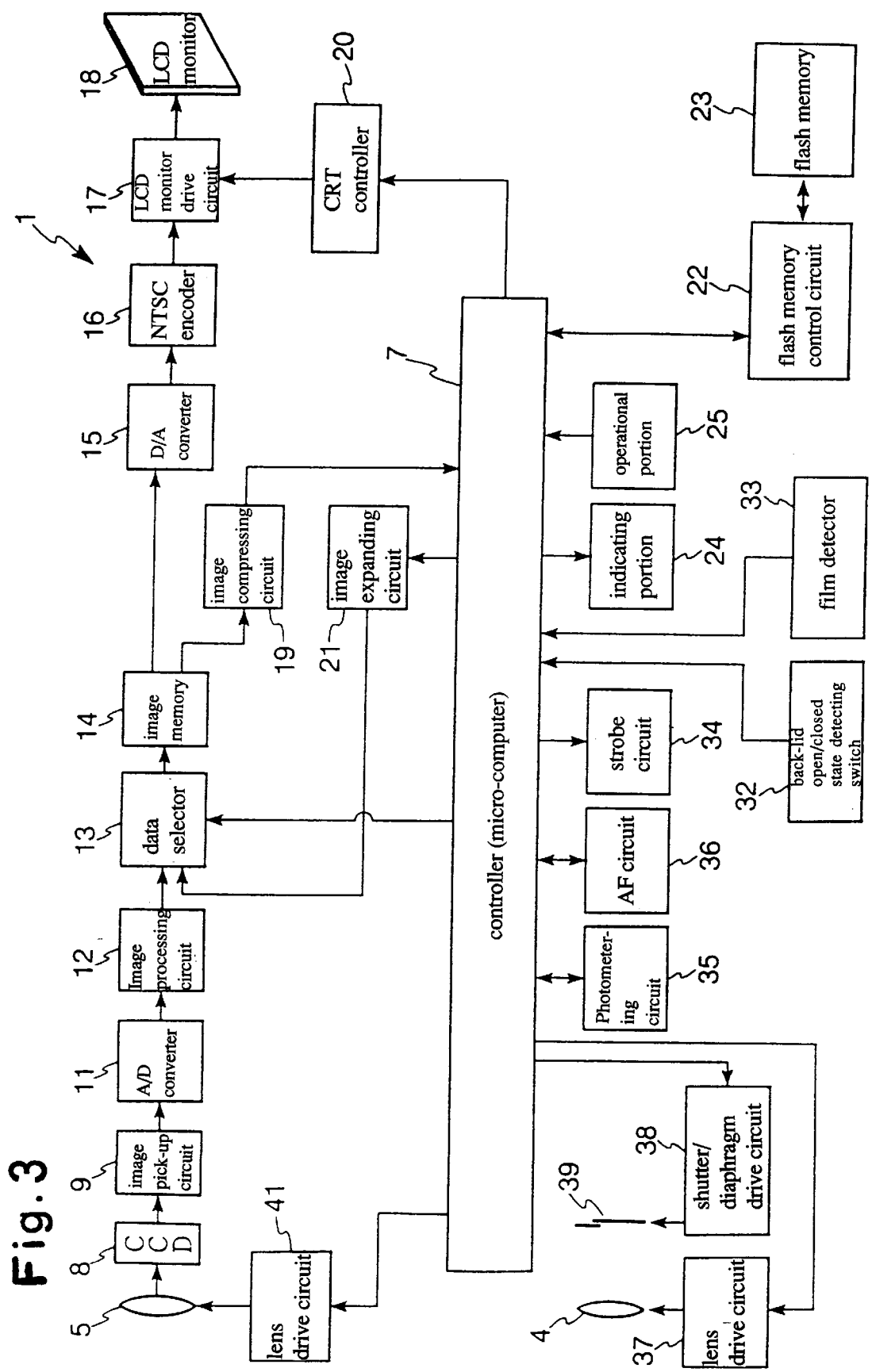
FIG. 3 is a block diagram showing an overall structure of the camera shown in FIG. 1.

FIG. 3 shows an overall structure of the camera 1. As shown in FIG. 3, the camera 1 is provided with an image pick-up device including of the aforementioned CCD 8 (serving as an image pick-up element) and an image pick-up circuit 9. The CCD 8 is provided with a large number of photo-diodes arranged in a matrix. Each diode accumulates a certain amount of electric charge according to the quantity of light received, and subsequently forwards the accumulated electric charges, one by one, at a prescribed time. The image pick-up circuit 9 controls the CCD 8 to forward the signals from the CCD 8 and/or process the read signals.

A CCD having a color filter is adopted as the CCD 8 in this particular embodiment. A filter for resolving light incident thereon into magenta (Mg), yellow (Ye), cyan (Cy) and green (G) components covers each photo-diode of the CCD 8. A mechanical shutter is not provided for the CCD 8, but an electrical shutter function of the CCD 8 is used as a shutter for the CCD 8.

The camera 1 is provided with a controller 7 generally made of a microcomputer including a CPU. The controller 7 performs various operations for the camera 1, and the various operations include a sequential control operation, a photometric calculation (exposure calculation), a subject-distance calculation, an auto-exposure operation, an autofocusing operation, etc.

The photographic information indicating portion 24 and an operational portion 25 are each electrically connected to the controller 7. The operational portion 25 is composed of a plurality of operational buttons or switches including a main power switch (not shown), the mode selecting button 26, the recording mode selecting switch 27, the pair of up/down buttons 28 and 29, and the shutter release button 31. By manually operating the mode selecting button 26, each of a photographing mode, a reproducing mode and an erasing mode can be selected. By manually operating the recording mode selecting switch 27, one of an IC memory recording mode (i.e., a second recording mode or a digital photographic mode), a film recording mode (i.e., a third recording mode or an analog photographic mode) and an analog/digital recording mode (i.e., a first recording mode or an analog/digital photographic mode) can be selected.

The photographic information indicating portion 24 may include an LCD or LED panel which indicates various photographic information. This information may include main power ON/OFF information, currently-selected mode information, the number of photographed film, the total number of photographed images including both analog and digital images, date and time of photography, etc.

A back lid open/closed state detecting switch 32, a film detector 33, a strobe circuit 34, a photometering circuit 35, an AF circuit (distance measuring circuit) 36, a lens drive circuit 37, a shutter/diaphragm drive circuit 38, and a lens drive circuit 41 are each connected to the controller 7.

The back lid open/closed state detecting switch 32 detects whether the back lid 3 is open or closed. The detecting switch 32 is turned ON and OFF when the back lid 3 is closed and opened, respectively.

The film detector 33 detects whether a film cartridge or patrone has been loaded in a cartridge chamber (not shown) of the camera 1. The film detector 33 outputs a signal which indicates that the film cartridge has been loaded to the controller 7.

The photometering circuit 35 meters the luminance of subjects with the use of a photometering sensor (not shown) and sends the metered subject luminance data to the controller 7.

The controller 7 performs a photometric operation (operation for exposure) in accordance with the aforementioned metered subject luminance data and photographic speed (i.e., ISO speed) information input from a photographic speed detecting device (not shown), determining an appropriate exposure (an appropriate aperture value and an appropriate shutter speed) for a lens shutter 39 of the camera 1, and at the same time, determining an appropriate exposure (an electric charge accumulating time) for the CCD 8. The lens shutter 39 serves as both a shutter and a diaphragm. The operation in which the appropriate exposure is determined for the lens shutter 39 or the CCD 8 is hereinafter referred to as "an AE (auto-exposure) operation."

The shutter/diaphragm drive circuit 38 is provided with a motor (not shown) for driving the lens shutter 39. The lens shutter 39 is provided with a plurality of opaque sector blades (not shown) which are pivoted on a rotational drive ring member (not shown) so that the sector blades open from the center to control exposure when the drive ring member is driven to rotate by the motor of the shutter/diaphragm drive circuit 38.

The AF circuit 36 is of an active-AF type that measures a subject distance (i.e., a distance from a film plane of the camera 1 to the subject) with the use of a pair of light emitting and receiving portions (not shown) provided at the front of the camera 1. The AF circuit 36 outputs subject distance information to the controller 7 after having measured the subject distance, and the controller 7 obtains the subject distance from the information input from the AF circuit 36.

The lens drive circuit 37 is provided with an AF motor (not shown) for driving an AF lens (not shown) of the first photographic optical system 4 to obtain an in-focus condition. Upon inputting the subject distance information from the AF circuit 36, in accordance with the information, the controller 7 outputs a command signal to the lens drive circuit 37 for driving the AF lens of the first photographic optical system 4 to obtain an in-focus condition. The lens drive circuit 37 controls the AF motor to rotate a rotating shaft for an appropriate amount of rotation in accordance with the input command signal to obtain an in-focus condition.

Likewise, the lens drive circuit 41 is provided with an AF motor (not shown) for driving an AF lens (not shown) of the second photographic optical system 5 to obtain an in-focus condition. Upon inputting the subject distance information from the AF circuit 36, in accordance with the information, the controller 7 outputs a command signal to the lens drive circuit 41 for driving the AF lens of the second photographic optical system 5 to obtain an in-focus condition. The lens drive circuit 41 controls the AF motor to rotate a rotating shaft for an appropriate amount of rotation in accordance with the input command signal to obtain an in-focus condition.

The operation in which an in-focus condition is obtained for the first or second photographic optical system 4 or 5 is hereinafter referred to as "an AF (autofocus) operation."

The controller 7 outputs a command signal for controlling the lens shutter 39 for an appropriate exposure time to the shutter/diaphragm drive circuit 38. Upon receiving the command signal from the controller 7, in accordance with the command signal, the shutter/diaphragm drive circuit 38 actuates the lens shutter 39. That is, the drive circuit 38 controls the motor of the shutter/diaphragm drive circuit 38 to rotate a rotational shaft of the same for an appropriate amount of rotation, so that a frame of film is exposed, i.e., light of a subject image is exposed on a frame of film.

The strobe circuit 34 controls a flashlight emitter (not shown) to emit light upon receiving a corresponding command signal output from the controller 7.

The camera 1 is provided with a flash memory (IC memory) 23 serving as a recording medium. The flash memory 23 has an image recording section for recording or storing digital image signals (image data) and a frame information storing section for storing frame information, the detail of which will be hereinafter discussed.

The operation of the camera 1 will be hereinafter discussed.

Each time the mode selecting button 26 is depressed, one of a command for setting the photographing mode, a command for setting the reproducing mode, or a command for setting the erasing mode are cyclically selected and input to the controller 7. Upon receiving one of the three commands the controller 7 sets the corresponding mode, i.e., the photographing mode, the reproducing mode or the erasing mode.

By manually operating the recording mode selecting switch 27, one of a command for setting the IC memory recording mode, a command for setting the film recording mode or a command for setting the analog/digital recording mode is selectively input to the controller 7. Upon receiving one of the three commands, the controller 7 sets the corresponding mode, i.e., the IC memory recording mode, the film recording mode or the analog/digital recording mode.

Although the recording mode selecting switch 27 is a sliding type switch in this particular embodiment, the recording mode selecting switch 27 may be a push-button type switch.

When in the IC memory recording mode, subjects are photographed with the CCD 8 (without the use of film) the photographed image data are then stored in the flash memory 23. The photographing operation in which image data of subjects are stored in the flash memory 23, while the same subjects are not photographed using film, is hereinafter referred to as "Recording Operation Only In IC Memory."

When in the film recording mode, subjects are photographed with film without the use of the CCD 8, i.e., without storing image data of the subjects in the flash memory 23. The photographing operation in which subjects are photographed using film, while image data of the same subjects are not stored in the flash memory 23, is hereinafter referred to as "Recording Operation Only On Film."

When in the analog/digital recording mode, the same subject is photographed with the use of both the film and the CCD 8, so that the subject is are exposed on the film while image data of the subject is are stored in the flash memory 23. This photographing operation is hereinafter referred to as "Recording Operation On Film And In IC Memory."

The operations of the camera 1 in the photographing mode, the reproducing mode and the erasing mode are hereinafter discussed.

(1) The Photographing Mode

As noted above, by manually operating the mode selecting button 26, the photographing mode can be selected. When taking a picture, the user determines the composition while looking through the finder optical system 6. Thereafter, in the case of the IC memory recording mode having been selected, fully depressing the shutter release button 31 causes the CCD 8 to perform an exposure operation, in which electric charge is accumulated in an amount that corresponds to the amount of light of subject images received on the CCD 8. The accumulated electric charge is forwarded to the image pick-up circuit 9.

The image pick-up circuit 9 performs a predetermined signal processing operation for the signals (electric charge) received from the CCD 8 to obtain analog image signals of the photographed subject images.

The obtained analog image signals are converted to digital image signals by an A/D converter 11 and are input to an image processing circuit 12. The image processing circuit 12 performs a predetermined image processing operation for the input digital image signals to obtain digital luminance signals (Y) and chroma signals (C). The digital luminance signals (Y) and chroma signals (C) will be hereinafter referred to as merely "digital image signals."

The digital image signals (image data) pass through a data selector 13 for selecting a receiving address in an image memory 14, the image data being temporarily stored in the selected address. The data selector 13 is controlled to perform its selecting operation by the controller 7.

Thereafter the digital image signals stored in a predetermined address in the image memory 14 are compressed by a predetermined amount by an image compressing circuit 19. These compressed digital image signals are input to a flash memory control circuit 22 (via the controller 7) to be stored or recorded in a predetermined address of the flash memory 23 (via the flash memory control circuit 22).

The aforementioned operations from the exposure operation of the CCD 8 to the recording operation of digital image signals in the flash memory 23 are hereinafter referred to as "Digital Image Process."

When the film recording mode is set, fully depressing the shutter release button 31 causes the controller 7 to input a command for driving the lens shutter 39 to perform an appropriate exposure to the shutter/diaphragm drive circuit 38. Upon receiving the command the shutter/diaphragm drive circuit 38 controls the motor of the lens shutter 39 to rotate the rotating shaft by a certain amount to drive the lens shutter 39, which causes the film to be exposed. This exposing operation is hereinafter referred to as the "Film Exposing Process."

When the analog/digital recording mode is set, fully depressing the shutter release button 31 causes the both of the Film Exposing Process and Digital Image Process to be carried out at the same time.

After taking a picture in any one of the IC memory recording mode, the film recording mode or the analog/digital recording mode, frame information, including which recording mode has been performed for which picture, is stored in the frame information storing section of the flash memory 23 by the flash memory control circuit 22. In this case, in the IC memory recording mode, frame information "S" (meaning that image data has been stored in the flash memory 23 but film has not been exposed) is stored in the frame information storing section of the flash memory 23. In the film recording mode, frame information "A" (meaning that film has been exposed but no image data has been stored in the flash memory 23) is stored in the frame information storing section of the flash memory 23. In the analog/digital recording mode, frame information "C" (meaning that film has been exposed and image data has also been stored in the flash memory 23) is stored in the frame information storing section of the flash memory 23.

As can be understood from the foregoing the frame information is stored for each shot.

Although the letters "S", "A" and "C" are used for the aforementioned respective pieces of frame information, these letters may be any other letters or symbols.

The frame information for each shot is stored in a data table in the frame information storing section (i.e., frame information data table) of the flash memory 23, each frame information symbol corresponding to a frame number N (N being a whole number). The frame numbers N (i.e., 1, 2, 3, 4, 5, . . . ) show the orders of shots, without regard to which recording mode (the IC memory recording mode, the film recording mode or the analog/digital recording mode) is used for which shot.

The details of how the frame information is stored are hereinafter discussed with reference to FIG. 4.

Figure 4:
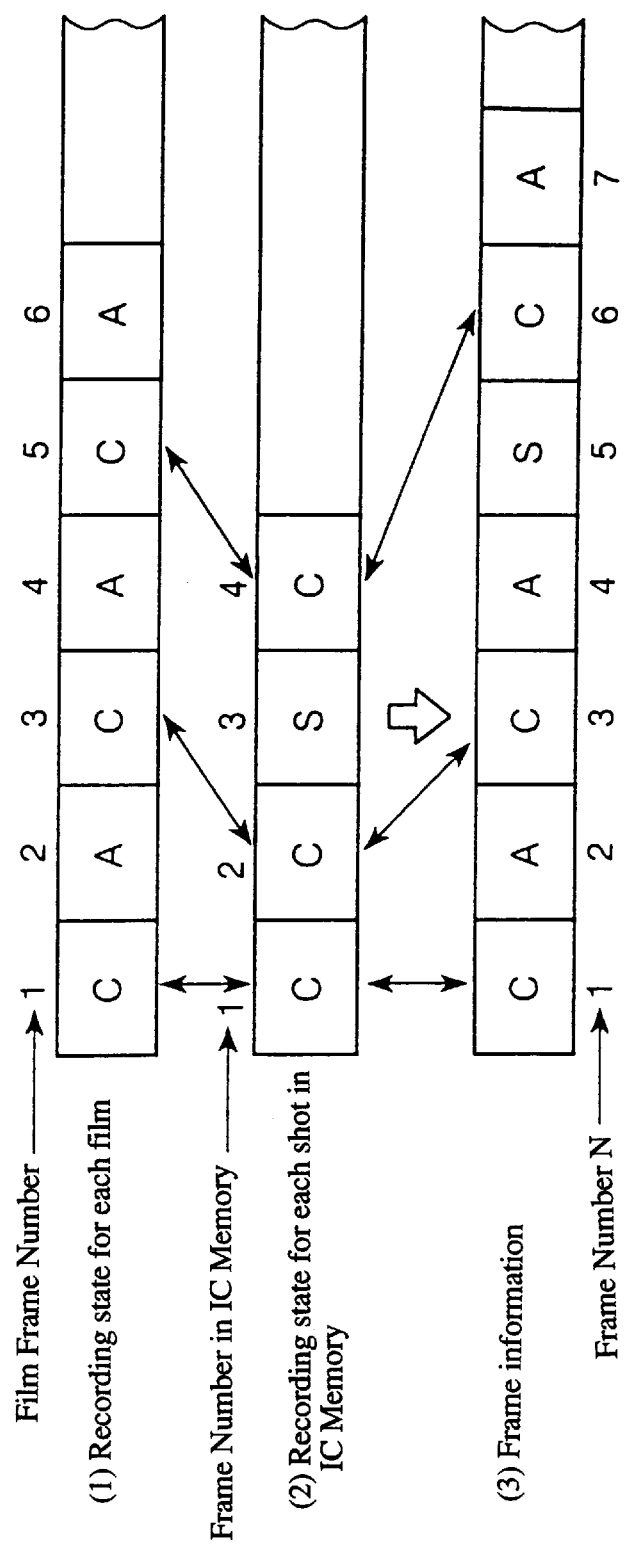
FIG. 4 is an explanatory illustration showing a data table in a flash memory in which frame information is stored.

In FIG. 4 "Film Frame Number" shows the order of shots on film, and "Frame Number in IC Memory" shows the order of shots of digital images.

In FIG. 4, (1) shows the recording state for each film frame, i.e., which recording mode (the film recording mode or the analog/digital recording mode) has been performed for which film frame by frame information "A" or "C".

In FIG. 4, (2) shows the recording state for each shot in the flash memory 23, i.e., which recording mode (the IC memory recording mode or the analog/digital recording mode) has been performed for which shot in the flash memory 23 by frame information "S" or "C".

In the case where subject images are photographed or recorded in a manner such as shown in (1) and (2) of FIG. 4, the frame information data table of the flash memory 23 is as shown in (3) of FIG. 4. Namely, in the frame information data table, "C, A, C, A, S, C, A" respectively correspond to the frame numbers N (1, 2, 3, 4, 5, 6, 7).

(2) The Reproducing Mode

As noted above, by manually operating the mode selecting button 26, the reproducing mode can be selected. Upon entering the reproducing mode, a stored digital image (e.g., a stored digital image of the earliest shot, i.e., the shot of frame number 1) is reproduced. In the reproduction, compressed digital image signals (image data) stored in the aforementioned predetermined address in the flash memory 23 are drawn out by the flash memory control circuit 22 an input to a digital image expanding circuit 21 (via the controller 7).

The digital image expanding circuit 21 expands the compressed digital image signals input from the flash memory 23 by a predetermined amount to restore the compressed digital image signals to thier original size, and the restored digital image signals are temporarily stored in a predetermined address in the image memory 14 through the data selector 13.

Thereafter, the digital image signals are read out from the predetermined address in the image memory 14 to be converted into analog signals through a D/A converter 15. The analog signals are input to an NTSC encoder 16. The NTSC encoder 16 converts the input analog signals into NTSC (standard) type television signals (video signals) in accordance with the luminance signals (Y) and chroma signals (C) of the input analog signals and synchronizing signals input from a synchronizing signal generating circuit (not shown).

The generated NTSC television signals are then output from the NTSC encoder 16 and input to an LCD monitor drive circuit 17. The LCD monitor drive circuit 17 drives the LCD monitor 18 to display digital images (reproducing images) thereon in accordance with the NTSC television signals input from the NTSC encoder 16. At the same time, the frame number N and a symbol or symbols which correspond to the frame information are indicated together with the digital images on the LCD monitor 18.

Figure 5:
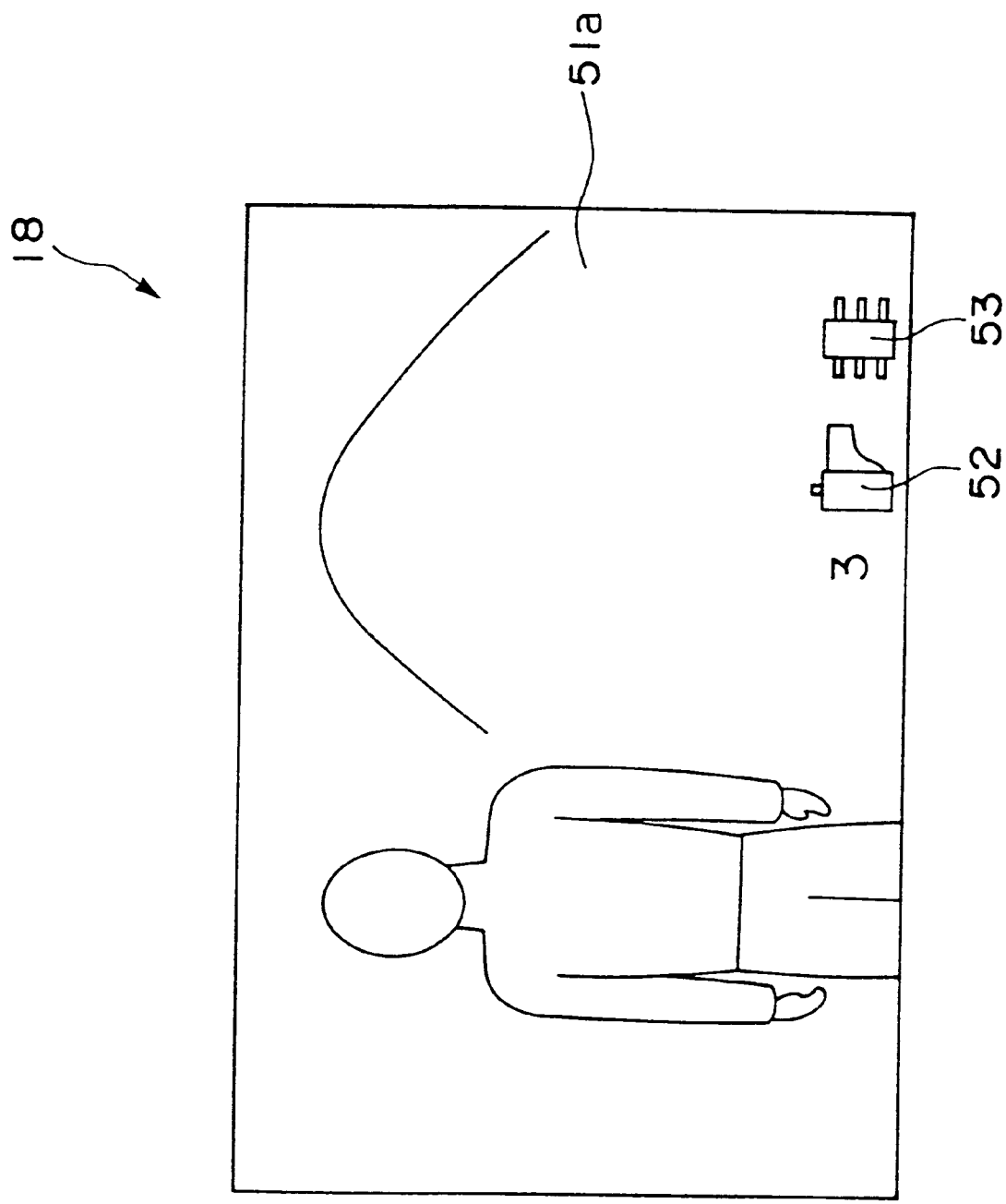
FIG. 5 is an example of an image indicated on a LCD monitor of the camera shown in FIG. 1, in the case where the photographed image is recorded both in the flash memory and on a frame of film.
Figure 6:
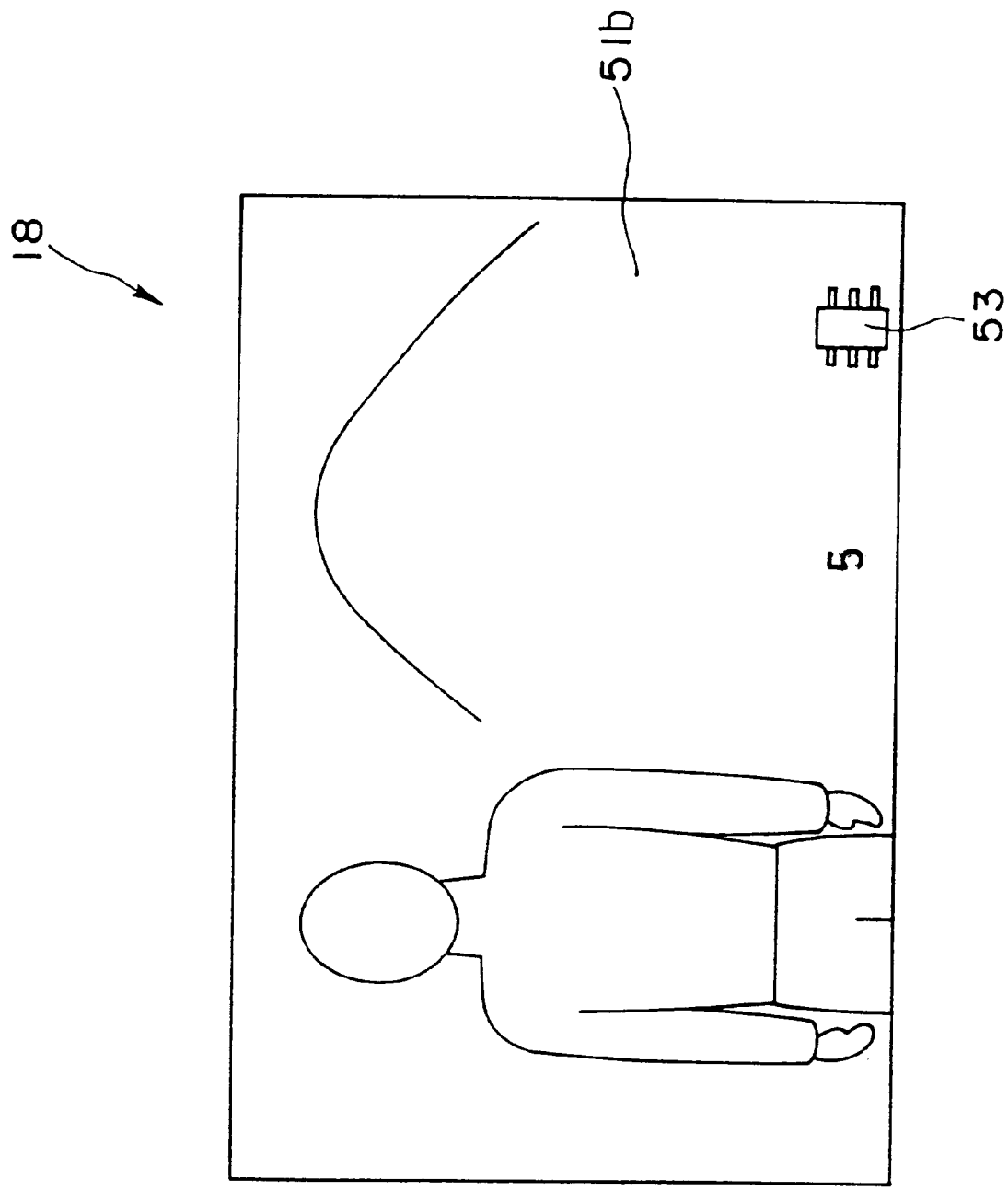
FIG. 6 is an example of an image indicated on a LCD monitor of the camera shown in FIG. 1, in the case where the photographed image is recorded only in the flash memory.
Figure 7:
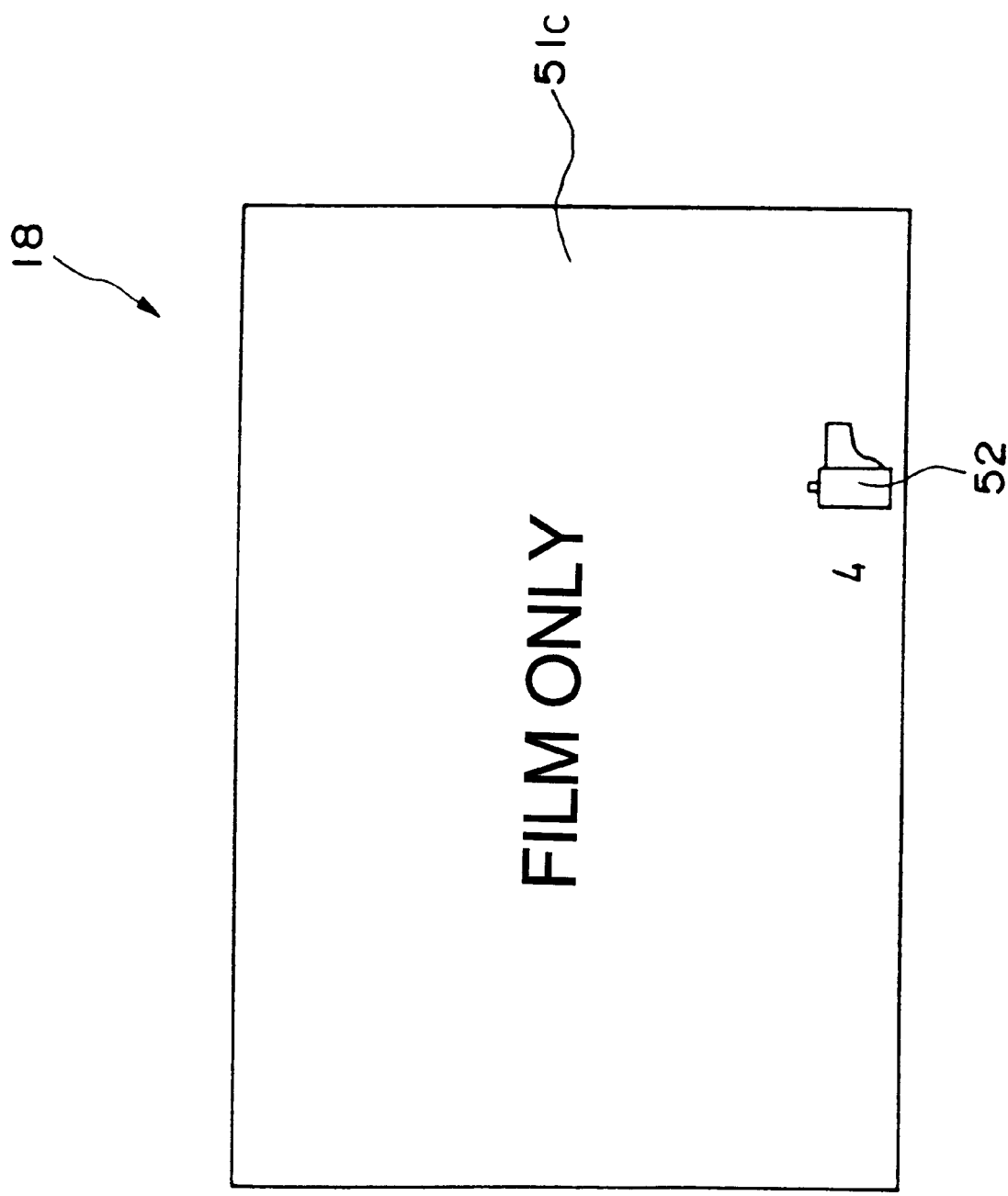
FIG. 7 is an example of an image indicated on a LCD monitor of the camera shown in FIG. 1, in the case where the photographed image is recorded only on a frame of film.

FIG. 5 shows an example of an image indicated on the LCD monitor 18 when the shot of the frame number 3, which has frame information "C" as shown in FIG. 4, (i.e., the image having been recorded in the analog/digital recording mode), is reproduced. FIG. 6 shows an example of an image indicated on the LCD monitor 18 when the shot of the frame number 5, which has frame information "S" as shown in FIG. 4, (i.e., whose image has been recorded in the IC memory recording mode) is reproduced. FIG. 7 shows an example of an image indicated on the LCD monitor 18 when the shot of the frame number 4, which has the frame information "A" as shown in FIG. 4, (i.e., whose image has been recorded in the film recording mode) is reproduced.

As shown in FIG. 5, when the shot of the frame number 3 is reproduced, the frame number "3" is indicated in a lower right portion in a reproduced image 51a indicated on the LCD monitor 18. In the vicinity of the frame number "3", a symbol 52 in the form of a film cartridge (which means that the image 51a has also been recorded on a film frame) and another symbol 53 in the form of an IC chip (which means that the image 51a has been recorded in the flash memory 23) are indicated on the LCD monitor 18.

As shown in FIG. 6, when the shot of the frame number 5 is reproduced, the frame number "5" and the symbol 53 are indicated in a lower right portion of a reproduced image 51b. In this case the symbol 52 is not indicated in the reproduced image 51b.

As shown in FIG. 7, when the shot of the frame number 4 is reproduced, an image 51c including a message "FILM ONLY" is indicated on the LCD monitor 18, and at the same time the frame number "4" and the symbol 52 are indicated in a lower right portion of the image 51c. Image data of the symbols or letters which includes the frame numbers (numerals), symbols 52 and 53, the message "FILM ONLY", a message "NO FILE", etc. which are indicated on the LCD monitor 18, have been stored in advance in a memory (not shown) in a CRT controller (i.e., on screen display controller) 20. When a shot is reproduced, the CRT controller 20 draws predetermined image signals, which correspond to the numeral, symbol (s) and/or message to be indicated on the LCD monitor 18. The predetermined image signals are drawn from the memory in the CRT controller 20 in accordance with a command signal output from the controller 7, so as to input the predetermined image signals to the LCD monitor drive circuit 17. The LCD monitor drive circuit 17 drives the LCD monitor 18 to indicate the numeral, symbol(s) and/or message on the LCD monitor 18 in accordance with the image signals received from the CRT controller 20. The numeral representing the frame number N and the symbol 53 are superimposed on an image (subject image) indicated on the LCD monitor 18 when a shot recorded in the IC memory recording mode is reproduced. The numeral representing the frame number N and the symbols 52 and 53 are superimposed on an image (subject image) indicated on the LCD monitor 18 when a shot recorded in the analog/digital recording mode is reproduced. The message "FILM ONLY", the numeral representing the frame number N and the symbol 52 are indicated at respective positions on the LCD monitor 18 when a shot recorded in the film recording mode is reproduced.

When the up button 28 is depressed once, the frame number N of a currently reproducing shot increases by one (1) so that the shot of the frame number N+1 is reproduced.

When the down button 29 is depressed once, the frame number N of a currently reproducing shot decreases by one (1) so that the shot of the frame number N-1 is reproduced.

(3) The Erasing Mode

As noted above, by manually operating the mode selecting button 26, the erasing mode can be selected. Upon entering the erasing mode a stored digital subject image of the earliest shot starts to be reproduced, similar to the initial operation of the reproducing mode. Since the reproducing operation in the erasing mode is identical to that in the reproducing mode, the explanation about the reproducing operation herein is omitted.

After entering the erasing mode, in the case where neither image data is stored in the flash memory 23 (including the case where all the stored images have been erased) nor film has been yet exposed, the message "NO FILE" is indicated on the LCD monitor 18.

When the user desires to erase the digital subject image of a specific frame number N, he or she selects the digital subject image to be erased by operating the pair of up/down buttons 28, 29. After the digital subject image to be erased has been selected, digital image signals (image data) for the digital subject image which are stored in a predetermined address in the flash memory 23 are erased immediately after the shutter release button 31 is fully depressed.

In such an erasing operation, in the case where the digital subject image of the frame number N which has been recorded in the analog/digital recording mode is erased, the frame information of the frame number N is changed from "C" to "A".

In the erasing operation, in the case where the digital subject image of the frame number N which has been recorded in the IC memory recording mode is erased, all the frame numbers more than N (i.e., N+1, N+2, N+3, . . . ) are each decreased by one (1). At the same time, each piece of frame information of the frame numbers more than N is shifted one frame number lower to an adjacent frame number. Namely, supposing the last frame number is $N_{MAX}$, all the pieces of frame information from the frame numbers N to $N_{MAX}-1$ will be rewritten to be those from the frame number N+1 to $N_{MAX}$, and at the same time the data stored in the flash memory 23 for the frame number $N_{MAX}$ will be erased so that the last frame number becomes $N_{MAX}-1$. It should be noted that "the last frame number $N_{MAX}$" herein means the frame number for the last shot.

Figure 8:
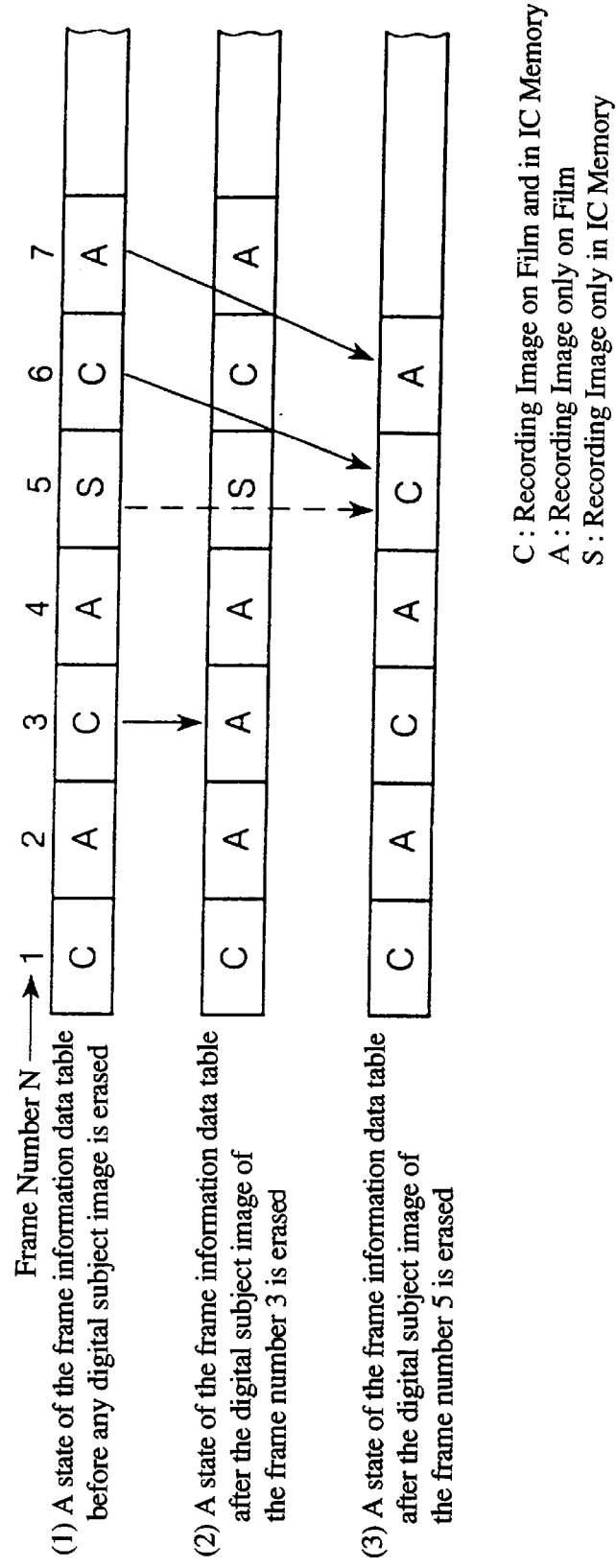
FIG. 8 is an explanatory illustration showing respective states of a data table in the flash memory before and after digital image data is erased.
Figure 9:
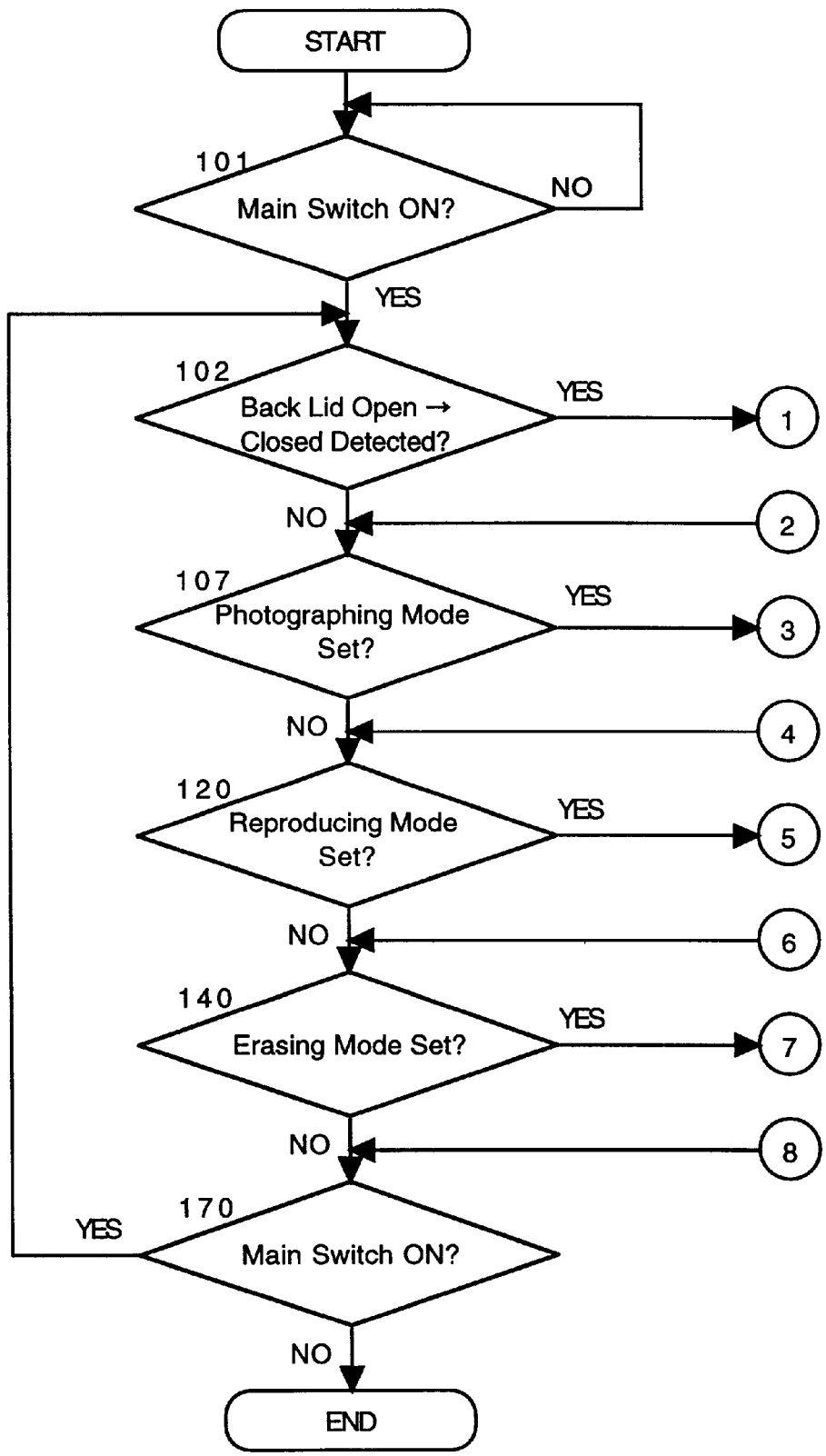
FIGS. 9 through 14 show a flow chart illustrating the operation of a controller provided in the camera.
Figure 10:
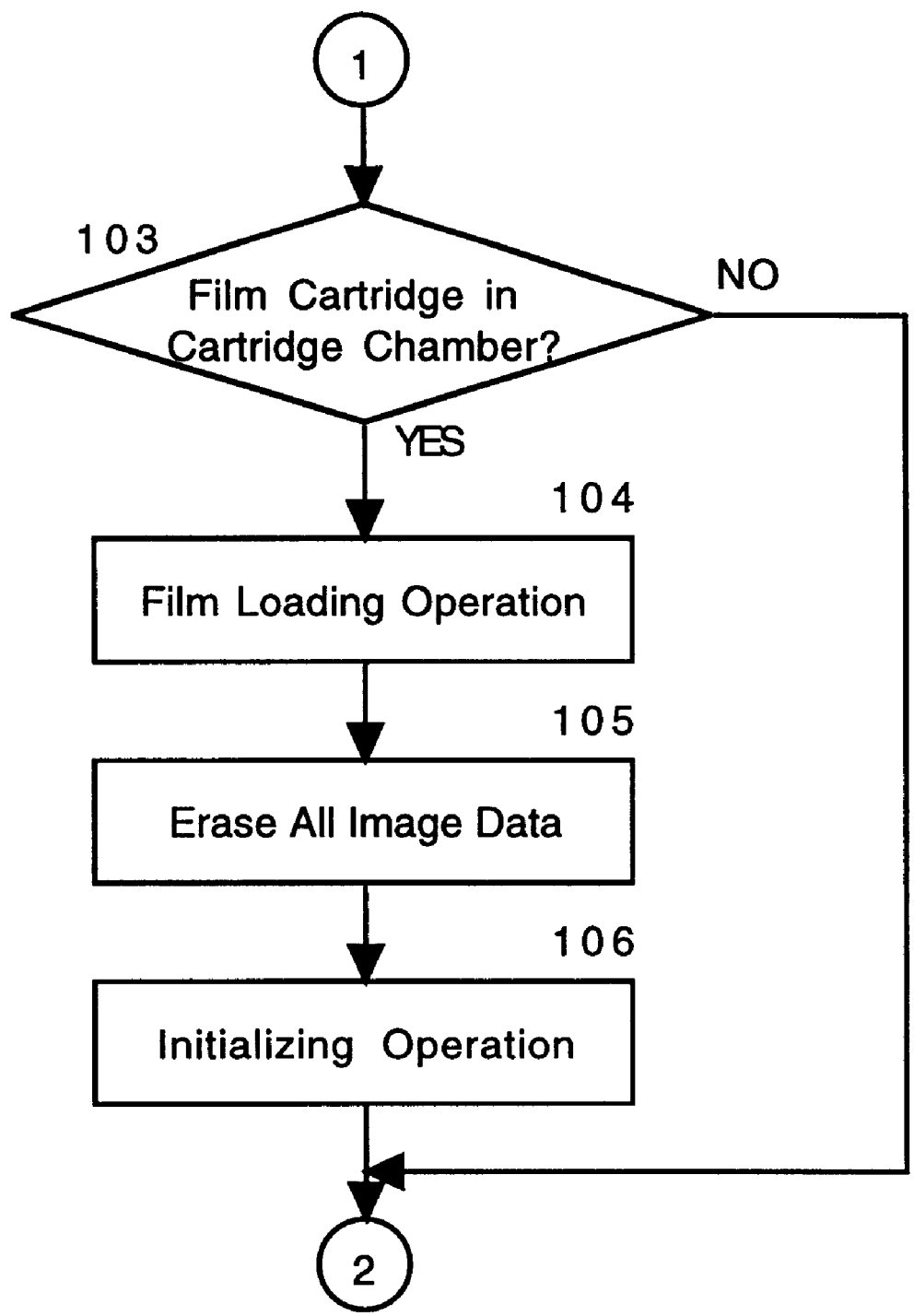
Figure 11:
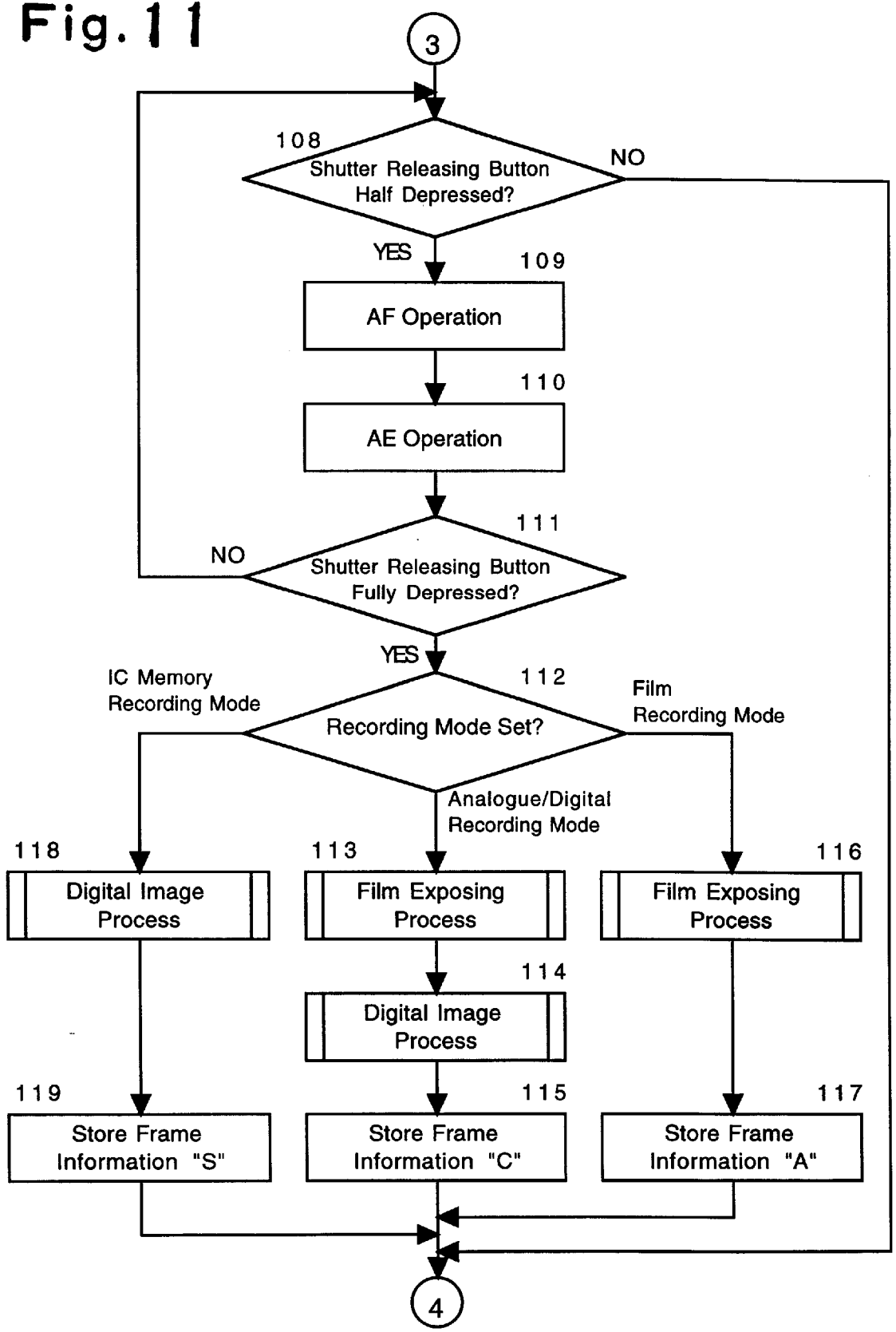
Figure 12:
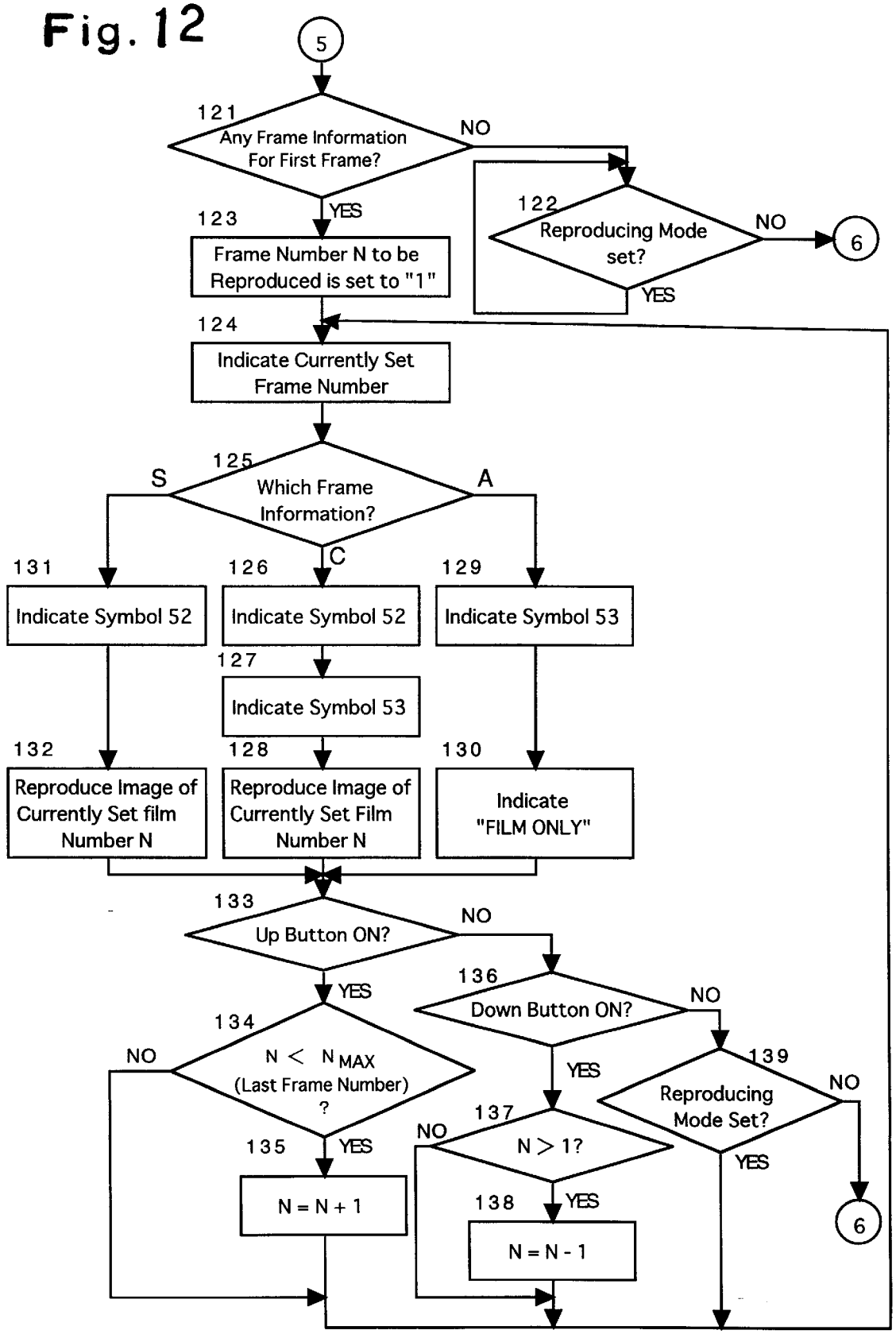
Figure 13:
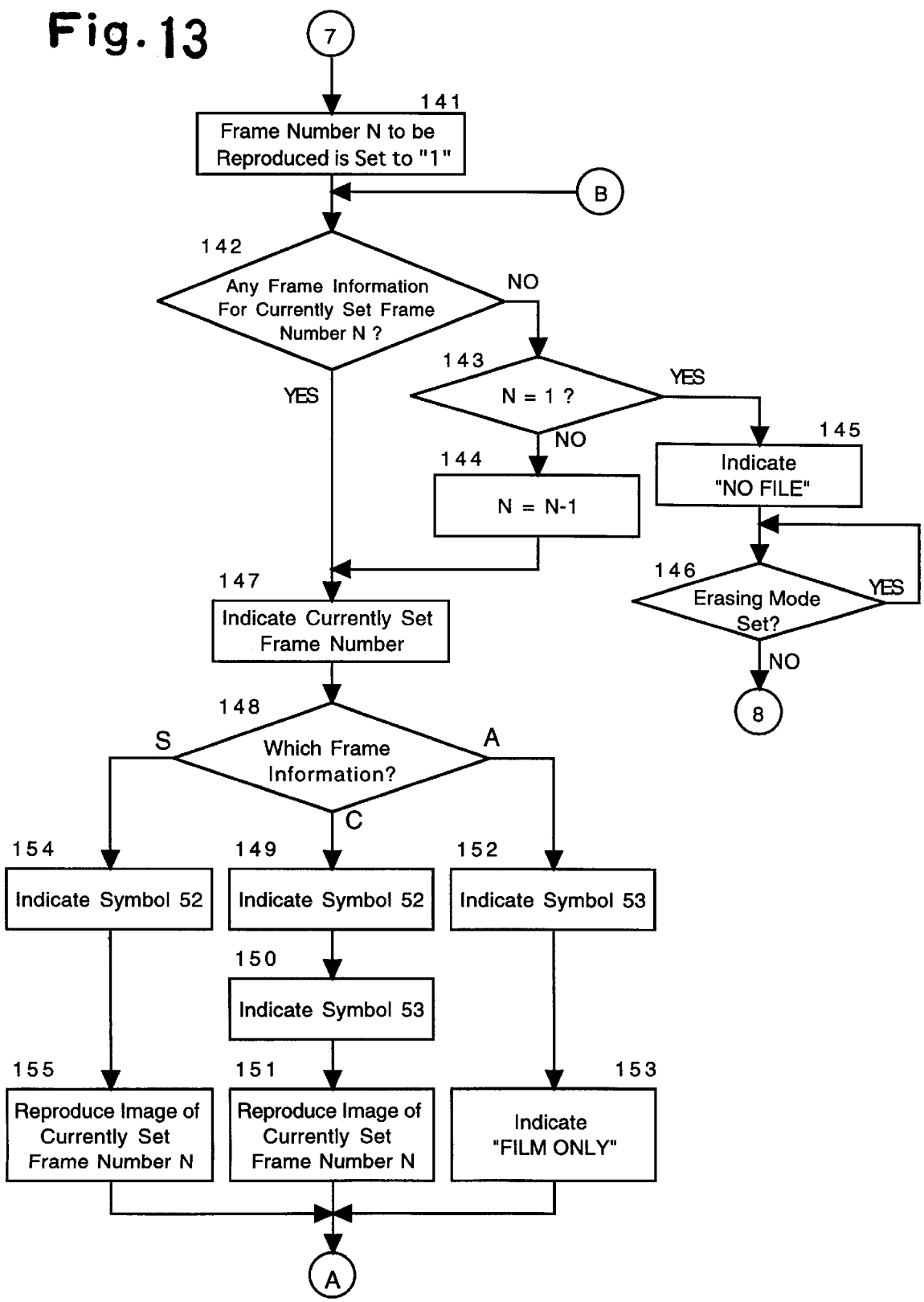
Figure 14:
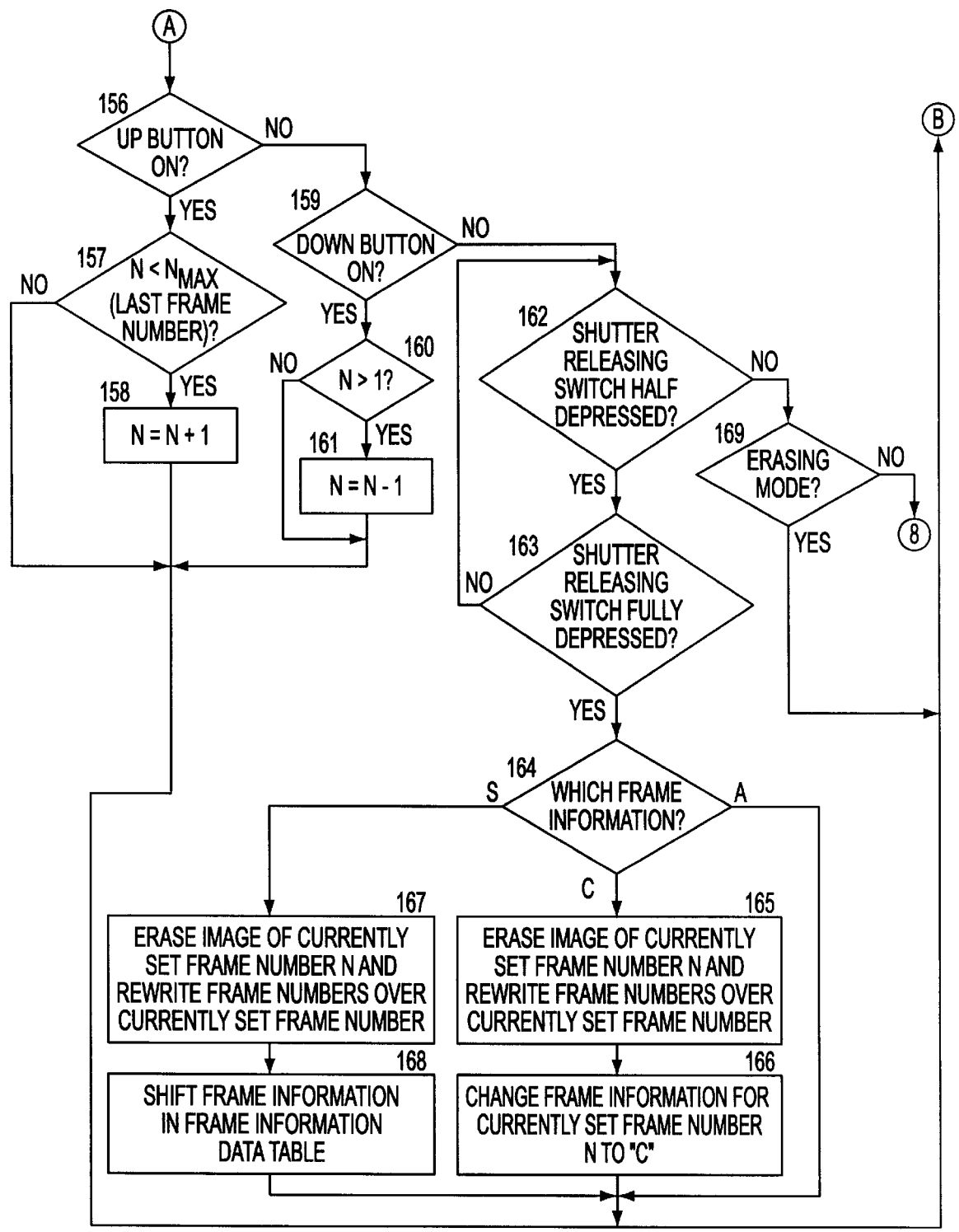

Such a rewriting operation for the frame numbers in the erasing operation in the erasing mode is further discussed in detail with reference to FIG. 8. FIG. 8 shows at (1) a state of the frame information data table before any digital subject image is erased. FIG. 8 shows at (2) a state of the frame information data table after the digital subject image of, e.g., the frame number 3 is erased, and FIG. 8 shows at (3) a state of the frame information data table after the digital subject image of, e.g., the frame number 5 is erased.

As shown at (1) of FIG. 8, the frame information of the frame number 3 is "C", meaning that film has been exposed and image data has been stored in the flash memory 23, so that the frame information "C" of the frame number 3 is replaced by "A" when the digital subject image of the frame number 3 is erased, as shown at (2) of FIG. 8.

As shown at (1) of FIG. 8, the frame information of the frame number 5 is "S", meaning that image data has been stored in the flash memory 23 but film has not been exposed, so that the frame information "S" of the frame number 5 and the frame information "C" of the frame number 6 are respectively replaced by "C" and "A" when the digital subject image of the frame number 5 is erased. At the same time the frame information "A" of the frame number 7 is deleted. Consequently, the last frame number $N_{MAX}$ becomes "6".

The operations of the controller 7 are hereinafter discussed with reference to FIGS. 9 through 14.

FIGS. 9 through 14 show flow charts of the operations of the controller 7.

First of all, it is judged at step 101 whether or not the main switch of the camera 1 is ON. Control proceeds to step 102 when it is judged at step 101 that the main switch is ON, or repeats the judging operation at step 101 when it is judged at step S101 that the main switch remains OFF. At step 102 it is judged whether the state of the back-lid open/closed state detecting switch 32 changes from OFF to ON (i.e., from an open state to a closed state). When it is judged at step 102 that the state of the back-lid open/closed state detecting switch 32 has changed from OFF to ON, control proceeds to step 103 at which it is judged whether a film cartridge is in the cartridge chamber of the camera 1. This judging operation at step 103 is performed in accordance with the signal input from the film detector 33.

When it is judged at step 103 that a film cartridge is in the cartridge chamber, control proceeds to step 104 at which a film auto-loading operation starts, such that a film is drawn out of the film cartridge by a film take-up spool of the camera 1, setting a first frame to be exposed for the first shot.

Thereafter, at step 105 all the image data stored in the flash memory 23 is erased. Subsequently, at step 106 each of the stored photographic data or information which includes the frame numbers N of digital subject images to be reproduced is initialized. At the same time, all the frame information stored in the frame information data table in the flash memory 23, etc. is initialized. After such an initializing operation control proceeds to step 107.

When it is judged at step 102 that the state of the back-lid open/closed state detecting switch 32 has not changed from OFF to ON, i.e., in the case where the state of the back-lid open/closed state detecting switch 32 changes from ON to OFF or the state of the back-lid open/closed state detecting switch 32 remains ON or OFF, control also proceeds to step 107.

At step 107 it is judged whether the photographing mode has been set. When it is judged at step 107 that the photographing mode has been set, control proceeds to step 108 at which it is judged whether the shutter release button 31 is half depressed. If it is judged at step 108 that the shutter release button 31 is half depressed, control proceeds to step 109 at which the aforementioned AF operation is performed. When it is judged at step 108 that the shutter release button 31 is not half depressed, control proceeds to step 120.

Subsequently, at step 110 the aforementioned AE operation is performed. Thereafter, it is judged at step 111 whether the shutter release button 31 is fully depressed. If it is judged at step 111 that the shutter release button 31 is not fully depressed, i.e., in the case where the shutter release button 31 is not at all depressed or still half depressed, control returns to step 108 so that the operations at steps 108 through 110 are again performed.

In the case where it is judged at step 111 that the shutter release button 31 is fully depressed, control proceeds to step 112 at which it is judged which recording mode (the IC memory recording mode, the film recording mode or the analog/digital recording mode) has been set. When it is judged at step 112 that the analog/digital recording mode has been set, control proceeds to step 113 at which the aforementioned Film Exposing Process is performed, so that a frame of film is exposed. Subsequently, at step 114 the aforementioned Digital Image Process is performed, so that subject image data is stored in the flash memory 23. Thereafter, at step 115 the frame information "C" is stored in the frame information data table in the flash memory 23, and subsequently control proceeds to step 120.

When it is judged at step 112 that the film recording mode has been set, control proceeds to step 116 at which the aforementioned Film Exposing Process is performed. Control then proceeds to step 117 at which the frame information "A" is stored in the frame information data table in the flash memory 23. Thereafter control proceeds to step 120.

When it is judged at step 112 that the IC memory recording mode has been set, control proceeds to step 118 at which the aforementioned Digital Image Process is performed, and subsequently proceeds to step 119 at which the frame information "S" is stored in the frame information data table in the flash memory 23. Thereafter control proceeds to step 120.

When it is judged at step 107 that the photographing mode has not been set, control proceeds to step 120. At step 120 it is judged whether the reproducing mode has been set. When it is judged at step 120 that the reproducing mode has been set, control proceeds to step 121 at which it is judged whether any frame information "C", "A" or "S" for the frame number 1 has been stored in the frame information data table in the flash memory 23. When it is judged at step 120 that the reproducing mode has not been set, control proceeds to step 140.

When it is judged at step 121 that no frame information for the frame number 1 has been stored in the frame information data table in the flash memory 23, control proceeds to step 122 at which the reproducing mode remains set. The operation at step 122 is repeated when the reproducing mode remains set. Control proceeds to step 140 when it is judged at step 122 that the reproducing mode is not set.

When it is judged at step 121 that any frame information "C", "A" or "S" for the frame number 1 has been stored in the frame information data table in the flash memory 23, control proceeds to step 123 at which the frame number N of image data to be reproduced is set "1". Subsequently, at step 124, the currently set frame number N is indicated on the LCD monitor 18 at a designated position.

Thereafter it is judged at step 125 which frame information "C", "A" or "S" has been set for the currently set frame number N. When it is judged at step 125 that the frame information "C" has been set for the currently set frame number N, control proceeds to step 126 at which the symbol 53 is indicated on the LCD monitor 18 at a designated position. Subsequently at step 127, the symbol 52 is indicated on the LCD monitor 18 at a designated position. Then, at step 128 the digital subject image of the currently set frame number N is reproduced on the LCD monitor 18 together with the currently set frame number N and the symbols 52, 53, in a similar manner to that shown in FIG. 5. Thereafter control proceeds to step 133.

When it is judged at step 125 that the frame information "A" has been set for the currently set frame number N, control proceeds to step 129 at which the symbol 52 is indicated on the LCD monitor 18 at a designated position. Subsequently at step 130 the message "FILM ONLY" is indicated on the center of the LCD monitor 18, together with the currently set frame number N and the symbols 52, in a similar manner to that shown in FIG. 7. Thereafter control proceeds to step 133.

When it is judged at step 125 that the frame information "S" has been set for the currently set frame number N, control proceeds to step 131 at which the symbol 53 is indicated on the LCD monitor 18 at a designated position. Subsequently, at step 132 the digital subject image of the currently set frame number N is reproduced on the LCD monitor 18 together with the currently set frame number N and the symbol 53, in a similar manner to that shown in FIG. 6. Thereafter control proceeds to step 133.

At step 133 it is judged whether the up button 28 is turned ON. Control proceeds to step 134 when it is judged at step 144 that the up button 28 is turned ON. At step 134 it is judged whether the last frame number $N_{MAX}$ is larger than the currently set frame number N.

When it is judged at step 134 that the last frame number $N_{MAX}$ is larger than the currently set frame number N, control proceeds to step 135 at which the currently set frame number N is increased by one (1). Thereafter control returns to step 124.

When it is judged at step 133 that the up button 28 is not turned ON, control proceeds to step 136, at which it is judged whether the down button 29 is turned ON. When it is judged at step 136 that the down button 29 is turned ON, control proceeds to step 137 at which it is judged whether the currently set frame number N is more than one (1). When it is judged at step 137 that the currently set frame number N is more than one, control proceeds to step 138, at which the currently set frame number N is decreased by one (1). Thereafter control returns to step 124.

When it is judged at step 136 that the down button 29 is not turned ON, control proceeds to step 139 at which it is judged whether the reproducing mode has been set. When it is judged at step 139 that the reproducing mode has been set, control returns to step 124. When it is judged at step 139 that the reproducing mode has not been set, control proceeds to step 140.

At step 140 it is judged whether the erasing mode has been set. Control proceeds to step 141 when it is judged at step 140 that the erasing mode has been set, or proceeds to step 170 when it is judged at step 140 that the erasing mode has not been set.

At step 141 the frame number N of image data to be reproduced is set "1". Subsequently, at step 142, it is judged whether any frame information "C", "A" or "S" for the currently set frame number N has been stored in the frame information data table in the flash memory 23. When it is judged at step 142 that no frame information for the currently set frame number N has been stored, control proceeds to step 143, at which it is judged whether the currently set frame number N is 1. When it is judged at step 143 that the currently set frame number N is not 1, control proceeds to step 144, at which the currently set frame number N is decreased by one (1), and subsequently control proceeds to step 147.

For instance, in the case where the currently set frame number N is 2 or more than 2, the currently set frame number N is decreased by one (1) when a subject image stored only in the flash memory 23 but on a film frame is erased. Thereafter control proceeds to step 147, at which the currently set frame number N and the like are indicated on the LCD monitor 18 at respective designated positions.

When it is judged at step 143 that the currently set frame number N is 1, control proceeds to step 145 at which the message "NO FILE" is indicated on the LCD monitor 18. Subsequently, it is judged at step 146 whether the erasing mode remains set. The operation at step 146 is repeated when the erasing mode remains set. Control proceeds to step 170 when it is judged at step 146 that the erasing mode is not set.

When it is judged at step 142 that any frame information "C", "A" or "S" for the currently set frame number N has been stored in the frame information data table in the flash memory 23, control proceeds to step 147 at which the currently set frame number N is indicated on the LCD monitor 18 at a designated position. Thereafter it is judged at step 148 which frame information "C", "A" or "S" has been set for the currently set frame number N. When it is judged at step 148 that the frame information "C" has been set for the currently set frame number N, control proceeds to step 149 at which the symbol 53 is indicated on the LCD monitor 18 at a designated position. Subsequently, at step 150 the symbol 52 is indicated on the LCD monitor 18 at a designated position. Then, at step 151, the digital subject image of the currently set frame number N is reproduced on the LCD monitor 18 together with the frame number N and the symbols 52, 53, in a similar manner to that shown in FIG. 5. Thereafter control proceeds to step 156.

When it is judged at step 148 that the frame information "A" has been set for the currently set frame number N, control proceeds to step 152, at which the symbol 52 is indicated on the LCD monitor 18 at a designated position. Subsequently at step 153, the message "FILM ONLY" is indicated on the center of the LCD monitor 18, together with the currently set frame number N and the symbols 52, in a similar manner to that shown in FIG. 7. Thereafter control proceeds to step 156.

When it is judged at step 148 that the frame information "S" has been set for the currently set frame number N, control proceeds to step 154, at which the symbol 53 is indicated on the LCD monitor 18 at a designated position. Subsequently, at step 155, the digital subject image of the currently set frame number N is reproduced on the LCD monitor 18 together with the currently set frame number N and the symbol 53, in a similar manner to that shown in FIG. 6. Thereafter control proceeds to step 156.

At step 156 it is judged whether the up button 28 is turned ON. Control proceeds to step 157 when it is judged at step 156 that the up button 28 is turned ON. At step 157 it is judged whether the last frame number $N_{MAX}$ is larger than the currently set frame number N.

When it is judged at step 157 that the last frame number $N_{MAX}$ is larger than the currently set frame number N, control proceeds to step 158, at which the currently set frame number N is increased by one (1). Thereafter control returns to step 142. When it is judged at step 157 that the last frame number $N_{MAX}$ is equal to or smaller than the currently set frame number N, control returns to step 142.

When it is judged at step 156 whether the up button 28 is not turned ON, control proceeds to step 159 at which it is judged whether the down button 29 is turned ON. When it is judged at step 159 that the down button 29 is turned ON, control proceeds to step 160 at which it is judged whether the currently set frame number N is more than one (1). When it is judged at step 160 that the currently set frame number N is more than one, control proceeds to step 161, at which the currently set frame number N is decreased by one (1). Thereafter control returns to step 142. When it is judged at step 160 that the currently set frame number N is equal to or less than one, control returns to step 142.

When it is judged at step 159 that the down button 29 is not turned ON, control proceeds to step 162, at which it is judged whether the shutter release switch 31 is half depressed. In the case where it is judged at step 162 that the shutter release switch 31 is half depressed, control proceeds to step 163, at which it is judged whether the shutter release switch 31 is fully depressed. When it is judged at step 163 that the shutter release switch 31 is not fully depressed, control returns to step 162 to perform the operation at step 162 again.

When it is judged at step 163 that the shutter release switch 31 is fully depressed, control proceeds to step 164, at which it is judged which frame information "C", "A" or "S" has been set for the currently set frame number N. When it is judged at step 164 that the frame information "C" has been set for the currently set frame number N, control proceeds to step 165, at which the image data of the currently set frame number N that is stored in the flash memory 23 is erased. Subsequently, at step 166, the frame information "C" for the currently set frame number N which is stored in the frame information data table is replaced by "A". Thereafter control returns to step 142.

When it is judged at step 164 that the frame information "A" has been set for the currently set frame number N, control returns to step 142.

When it is judged at step 164 that the frame information "S" has been set for the currently set frame number N, control proceeds to step 167, at which the image data of the currently set frame number N that is stored in the flash memory 23 is erased and at the same time all the frame numbers more than the currently set frame number N (i.e., N+1, N+2, N+3, . . . ) are each decreased by one (1). Subsequently, at step 168, each piece of frame information of all the frame numbers more than the currently set frame number N is shifted one lower to an adjacent frame number. That is, due to the operation at step 168, all the pieces of frame information from the frame numbers N to $N_{MAX}-1$ are rewritten to be those from the frame number N+1 to $N_{MAX}$, and at the same time the data stored in the flash memory 23 for the frame number $N_{MAX}$ is erased so that the last frame number becomes $N_{MAX}-1$. After step 168 control returns to step 142.

When it is judged at step 162 that the shutter release switch 31 is not half depressed, control proceeds to step 162 at which it is judged whether the erasing mode remains set. In the case where it is judged at step 169 that the erasing mode remains set, control proceeds to step 142. In the case where it is judged at step 169 that the erasing mode is not set, control proceeds to step 170. At step 170, it is judged whether the main switch of the camera 1 is ON or OFF. When it is judged at step 170 that the main switch is ON, control returns to step 102, so that the operations at and after step 102 are again performed. When it is judged at step 170 that the main switch is OFF, control ends to stop the operations of the camera 1.

As can be seen from the foregoing, according to the camera 1 to which the present invention is applied, for each shot, the frame information together with a digital subject image or the message "FILM ONLY" is indicated on the LCD panel. Accordingly, the user can surely recognize which shot was photographed in which recording mode (the IC memory recording mode, the film recording mode, or the analog/digital recording mode). Furthermore, the user can confirm the recording states of all shots by reproducing all the shots one by one.

According to the camera 1, in the case where a frame (frame number) bearing no image in the flash memory 23 or on film occurs after the image data for the frame is erased, all the following frames after the frame bearing no image (blanked frame) are each shifted by one towards the blanked frame to fill in the blanked frame, which removes any blanked frame or frames between frames bearing images in the flash memory or on film. Due to such an operation, the number of images that can be recorded in the flash memory 23 increases. Accordingly, the section of the flash memory 23 which is designated for recording image data can be effectively utilized, as compared with the case where the aforementioned operation is not carried out According to the camera 1, each time a picture is taken, corresponding frame information ("C", "A" or "S") is automatically and surely recorded for the picture in accordance with the recording mode (the IC memory recording mode, the film recording mode and the analog/digital recording mode). Therefore, the user does not have to keep track of data about which photographic mode has been performed for which shot, e.g., on a piece of paper or the like.

Obvious changes may be made in the specific embodiments of the present invention described herein, such modifications being within the spirit and scope of the invention claimed. It is indicated that all matter contained herein is illustrative and does not limit the scope of the present invention.

For example, the structure of the camera 1 may be modified such that the image data is recorded in a detachable recording medium such as an IC memory cord or the like.

The flash memory 23 of the camera 1 may be replaced by any other recording medium or storage medium such as an EEPROM, an optical disc, an optical-magnetic disc, a magnetic disc, etc.

Furthermore, the first and second photographic optical systems 4 and 5 may be modified to share a common optical member.

What is claimed is:

1. A camera comprising:

a first memory unit;

a first image taking portion for taking pictures as obtained digital images stored in a first memory unit;

a second image taking portion for taking pictures as images on a film;

a controller for selectively performing one of a first operation in which said first image taking portion is actuated independently of said second image taking portion; a second operation in which said second image taking portion is actuated independently of said first image taking portion; and a third operation in which both said first and second image taking portions are simultaneously actuated to take common subject pictures,;

a second memory unit for storing operation information representing which of said first operation, said second operation and said third operation has been performed for each taken picture of a plurality of pictures taken;

an indicating device for displaying an operation information indication for each taken picture, said operation information indication representing which of said first operation, said second operation and said third operation has been performed; and a reproducing device for reproducing said obtained digital images, wherein said indicating device displays said obtained digital images reproduced by said reproducing device together with said operation information indication for each of said obtained digital images.

2. The camera according to claim 1, wherein said first image taking portion comprises:

an image pick-up element for generating image data of a subject image;

a first optical system for forming the subject image on said image pick-up element; and an image processor for processing the image data, obtained from said image pick-up element, to obtain said obtained digital images.

3. The camera according to claim 2, wherein said image pick-up element includes a CCD.

4. The camera according to claim 2, wherein said second image taking portion comprises a second optical system for forming said subject image on said film.

5. The camera according to claim 1, further comprising a recording device for recording said obtained digital images in said first memory unit.

6. The camera according to claim 1, further comprising a recording device for recording said operation information in said second memory unit.

7. The camera according to claim 1, wherein said first memory unit and said second memory unit are provided within a same memory device.

8. The camera according to claim 7, wherein said same memory device includes a flash memory.

9. The camera according to claim 1, further comprising a manual setting device for manually setting one of a first operation mode in which said controller performs said first operation; a second operation mode in which said controller performs said second operation; and a third operation mode in which said controller performs said third operation.

10. The camera according to claim 9, further comprising a setting output device for outputting set mode information representing which of said first operation mode, said second operation mode and said third operation mode has been set by said manual setting device, wherein said operation information is stored in said second memory unit by said controller in accordance with said set mode information output from said setting output device.

11. The camera according to claim 1, wherein said indicating device comprises an LCD panel.

12. The camera according to claim 1, further comprising an erasing device for erasing a designated digital image stored in said first memory unit, and for replacing operation information for the designated erased digital image in said second memory unit by new operation information when said erasing device erases said designated digital image.

13. The camera according to claim 12, further comprising a judging device for judging whether said second image taking portion has taken a picture, as an image on said film, having said erased designated digital image as a common subject picture.

14. The camera according to claim 13, further comprising an arranging device for arranging said digital images stored in said first memory unit after said erasing device erases said digital image by overwriting blanked storing space with remaining digital images stored in said first memory unit to consecutively store the remaining digital images when said judging device judges that said second image taking portion has not taken a picture as an image on said film having said erased designated digital image as a common subject picture.

15. The camera according to claim 1, wherein said indicating device superimposes said operation information on said digital image displayed by said reproducing device.

16. The camera according to claim 15, wherein said operation information includes a frame number, and at least one predetermined symbol of different predetermined symbols representative of said first operation, said second operation, and said third operation.

17. A camera comprising:

a first memory;

a first image taking portion for taking pictures as digital images stored in said first memory;

a second image taking portion for taking pictures as images on a film;

a selector for manually selecting one of a first picture taking mode in which only said first image taking portion is actuated; a second picture taking mode in which only said second image taking portion is actuated; and a third picture taking mode in which both said first and second image taking portions are simultaneously actuated;

a second memory for storing mode information representing which of said first picture taking mode, said second picture taking mode, and said third picture taking mode has been performed for each of a plurality of pictures taken; and a display for visually indicating said mode information for each taken picture, said visual indication of said mode information representing which of said first operation, said second operation and said third operation has been performed.

* * * * *

UNITED STATES PATENT AND TRADEMARK OFFICE
CERTIFICATE OF CORRECTION

PATENT NO. : 5,950,031
DATED : September 7, 1999
INVENTOR(S) : N. YAMAGATA

It is certified that error appears in the above-identified patent and that said Letters Patent is hereby corrected as shown below:

On the cover of the printed patent at Item [73], Assignee, "Asah Kogaku Kogto Kabushiki Kaisha" should be --Asahi Kogaku Kogyo Kabushiki Kaisha--.

Signed and Sealed this

Twenty-seventh Day of February, 2001

Attest:

NICHOLAS P. GODICI

Attesting Officer

Acting Director of the United States Patent and Trademark Office